United States Patent Office 2,835,627 Patented May 20, 1958

1

2,835,627

STABLE VITAMIN $B_{12}$ SOLUTIONS

James W. Conine and Donald A. Zuck, Indianapolis, Ind., assignors to Eli Lilly and Company, Indianapolis, Ind., a corporation of Indiana No Drawing. Application July 5, 1957
Serial No. 669,933

6 Claims. (Cl. 167—81)

This invention relates to the stabilization of aqueous solutions containing vitamin $B_{12}$.

It is well recognized that although vitamin $B_{12}$ is relatively stable in aqueous solution when the solution is contained in sealed vials which are protected from direct sunlight, the vitamin is often quite unstable when it is incorporated in a mixture with other substances. This is especially true when the composition is a medicinal preparation of such a character that its dispensing requires frequent opening of the container in which the preparation is packaged. It is further well recognized that other vitamins, particularly ascorbic acid (vitamin C) can have a destructive effect upon vitamin $B_{12}$. For example, the action of ascorbic acid is such that when the latter vitamin is incorporated with vitamin $B_{12}$, as in a multivitamin preparation, the vitamin $B_{12}$ activity of the preparation constantly and rapidly deteriorates regardless of whether the preparation is contained in a sealed or readily openable container. Hence, it is highly desirable to provide stabilization for vitamin $B_{12}$ in aqueous solutions which solutions contain ingredients destructive to vitamin $B_{12}$ activity and might be repeatedly exposed to the atmosphere in dispensing.

We have discovered that vitamin $B_{12}$ containing multivitamin mixtures such as aqueous solutions or suspensions are obtained in stabilized form by incorporating in the mixtures in relatively small amount, a stabilizing agent which is an $\alpha$-hydroxynitrile or an aliphatic or monocyclic aromatic O-acyl derivative thereof.

$\alpha$-Hydroxynitriles suitable for use in this invention are represented by the following formula:

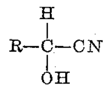

in which R is a lower alkyl or a monocyclic aryl radical. By way of example, R can be a methyl, ethyl, butyl, hexyl, phenyl, chlorophenyl, dichlorophenyl, hydroxyphenyl, anisyl, veratryl, tolyl, vanillyl or like radical.

The O-acylated $\alpha$-hydroxynitriles which likewise serve effectively as stabilizing agents embrace the above-represented $\alpha$-hydroxynitriles in which the hydrogen of the hydroxy group is replaced with an acyl group such as an acetyl, benzoyl, substituted benzoyl, hexahydrobenzoyl, carbethoxy, butyryl, benzenesulfonyl or like groups.

Illustrative examples of $\alpha$-hydroxynitriles and acyl derivatives thereof useful in stabilizing aqueous vitamin $B_{12}$ multivitamin preparations include the following: lactonitrile, acetolactonitrile, O-benzoyllactonitrile, $\alpha$-hydroxypropiononitrile, o-hydroxymandelonitrile, 2,4-dichloromandelonitrile, o-chloromandelonitrile, O-propionylchloromandelonitrile, p-methoxymandelonitrile, O-crotyl-3,4-dimethoxymandelonitrile, O-benzenesulfonyl-o-methylmandelonitrile, O-p-chlorobenzoylmandelonitrile, and $\alpha$- hydroxycaprylonitrile.

For most effective stabilizaiton of the vitamin $B_{12}$ in a multivitamin preparation, the stabilizing agent is employed in the preparation in a concentration of about 0.005 to about 0.5 percent, the percentages being expressed as weight/volume with respect to the total volume of the vitamin solution or suspension. The present preferred concentration range is from about 0.01 to about 0.05 percent. Such a range provides fully effective stabilization of the vitamin $B_{12}$ in the preparation, but is sufficiently low to avoid any disadvantages such as noticeable taste, etc. which might accompany the use of the higher concentration mentioned above.

2

The effective stabilization of vitamin $B_{12}$ provided in accordance with this invention has been demonstrated by experimental aging tests. The comparative stability test was carried out on multivitamin mixtures dispersed in 5 percent aqueous alcohol made up to contain in each milliliter of dispersion about the following amounts of vitamins:

| | |
|---|---|
| Thiamin chloride | 0.214 mg. |
| Riboflavin-5-phosphate (sodium salt) | 0.266 mg. |
| Ascorbic acid | 12.9 mg. |
| Nicotinamide | 2.2 mg. |
| Pyridoxine hydrochloride | 0.22 mg. |
| Vitamin A (palmitate) | 699 U. S. P. units. |
| Vitamin D | 220 U. S. P. units. |
| Vitamin $B_{12}$ | 0.8 mcg. |

One solution was retained as a control, and to the other solutions or to separate aliquots thereof the following $\alpha$-hydroxynitriles were added in a concentration of 0.1 percent: lactonitrile, m-hydroxymandelonitrile, p-methoxymandelonitrile, o-chloromandelonitrile, and 3-methoxy-4-hydroxymandelonitrile. The samples were allowed to stand for fifteen months at 26° C. At the end of that time they were reassayed for their vitamin $B_{12}$ activity. The assays showed that the vitamin $B_{12}$ content of the control sample had fallen to about 15 percent of its original activity, whereas those samples to which the above-listed stabilizers had been added, had retained respectively about 75, 85, 75, 85 and 85 percent of their original vitamin $B_{12}$ content.

An illustrative example of an aqueous multivitamin composition stabilized in accordance with this invention is as follows:

| | |
|---|---|
| Synthetic vitamin A palmitate | 600 U. S. P. units. |
| Vitamin D | 200 U. S. P. units. |
| Thiamin chloride | 0.2 mg. |
| Riboflavin-5-phosphate (sodium salt) | 0.24 mg. |
| Pyridoxine hydrochloride | 0.2 mg. |
| Nicotinamide | 2.0 mg. |
| Ascorbic acid | 12.0 mg. |
| Vitamin $B_{12}$ | 0.6 mcg. |
| Mandelonitrile | 0.01 percent (w./v.). |

The above ingredients together with suitable emulsifying and flavoring agents are incorporated in a 5 percent aqueous alcohol solution of sufficient volume to provide the above quantities of ingredients in each milliliter of emulsion. The mixture is thoroughly emulsified and the pH is adjusted to about pH 3.8. The mixture is then suitably bottled for distribution to the trade.

An example of a solution of a multivitamin composition stabilized in accordance with this invention is as follows:

| | |
|---|---|
| Thiamin chloride | 25 mg. |
| Pyridoxine hydrochloride | 10 mg. |
| Nicotinamide | 100 mg. |
| Riboflavin-5-phosphate (sodium salt) | 6 mg. |
| Sodium pantothenate | 5 mg. |
| Ascorbic acid | 150 mg. |
| Vitamin $B_{12}$ | 10 mcg. |
| Lactonitrile | 0.05 percent (w./v.). |

The above ingredients are dissolved in sufficient 5 percent aqueous alcohol in amount sufficient to provide the above quantities in each 2 ml. of solution. To the solution are added such flavoring and coloring agents as are desired, and the final solution is filled in suitable dispensing bottles.

In place of the mandelonitrile and lactonitrile employed in the foregoing examples, any of the other stabilizing agents set forth hereinabove can be used to provide multivtamin solutions which retain substantially all of their vitamin $B_{12}$ activity for long periods of time.

We claim:

1. A composition comprising an aqueous multivitamin preparation containing vitamin $B_{12}$ and on a weight/volume basis about 0.005 to about 0.5 percent of a compound of the group consisting of an α-hydroxynitrile and its aliphatic and monocyclic aromatic O-acyl derivatives, said α-hydroxynitrile being represented by the following formula:

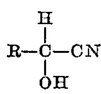

in which R represents a member of the group consisting of lower alkyl and monocyclic aryl radicals.

2. A composition comprising an aqueous multivitamin solution containing vitamin $B_{12}$ and on a weight/volume basis from about 0.005 to about 0.5 percent of a compound represented by the following formula:

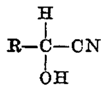

in which R is a member of the group consisting of lower alkyl and monocyclic aryl radicals.

3. A composition comprising an aqueous multivitamin solution containing vitamin $B_{12}$ and on a weight/volume basis from about 0.005 to about 0.5 percent of a compound represented by the following formula:

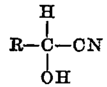

in which R represents the phenyl radical.

4. A composition comprising an aqueous multivitamin solution containing vitamin $B_{12}$ and on a weight/volume basis from about 0.005 to about 0.5 percent of a compound represented by the following formula:

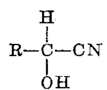

in which R represents the o-chlorophenyl radical.

5. A composition comprising an aqueous multivitamin solution containing vitamin $B_{12}$ and on a weight/volume basis from about 0.005 to about 0.5 percent of a compound represented by the following formula:

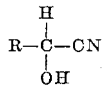

in which R represents the p-methoxyphenyl radical.

6. A composition comprising an aqueous multivitamin solution containing vitamin $B_{12}$ and on a weight/volume basis from about 0.005 to about 0.5 percent of a compound represented by the following formula:

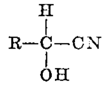

in which R represents the 3-methoxy-4-hydroxyphenyl radical.

References Cited in the file of this patent

UNITED STATES PATENTS

| | | |
|---|---|---|
| 1,856,186 | Hoffmann | May 3, 1932 |
| 1,957,134 | Frederick | May 1, 1934 |